(12) United States Patent
Oh et al.

(10) Patent No.: US 10,322,977 B2
(45) Date of Patent: Jun. 18, 2019

(54) ANIMAL HAIR WASTE TREATING APPARATUS AND METHOD

(71) Applicants: GIDICHEM CO., LTD., Jeollabuk-do (KR); PRIVATE COMPANY GREEN WORLD, Jeollabuk-do (KR)

(72) Inventors: Mi Hye Oh, Jeollabuk-do (KR); Na Hyeon Ryu, Jeollabuk-do (KR); Yeon Seok Ryu, Jeollabuk-do (KR); Youn Woo Lee, Jeollabuk-do (KR)

(73) Assignees: GIDICHEM CO., LTD., Gimje-si, Jeollabuk-do (KR); PRIVATE COMPANY GREEN WORLD, Iksan-si, Jeollabuk-do (KR)

( * ) Notice: Subject to any disclaimer, the term of this patent is extended or adjusted under 35 U.S.C. 154(b) by 512 days.

(21) Appl. No.: 15/021,703

(22) PCT Filed: Jun. 2, 2014

(86) PCT No.: PCT/KR2014/004882
§ 371 (c)(1),
(2) Date: May 19, 2016

(87) PCT Pub. No.: WO2015/056860
PCT Pub. Date: Apr. 23, 2015

(65) Prior Publication Data
US 2016/0251274 A1    Sep. 1, 2016

(30) Foreign Application Priority Data

Oct. 15, 2013 (KR) .................. 10-2013-0122354

(51) Int. Cl.
*B09B 3/00* (2006.01)
*C05F 1/00* (2006.01)
(Continued)

(52) U.S. Cl.
CPC .................. *C05F 1/00* (2013.01); *B09B 3/00* (2013.01); *B09B 3/0083* (2013.01); *D06M 11/13* (2013.01);
(Continued)

(58) Field of Classification Search
CPC .................................... C05F 1/00; B09B 3/00
See application file for complete search history.

(56) References Cited

U.S. PATENT DOCUMENTS 3,617,313 A * 11/1971 Harrington, Jr. ....... A23J 1/002
422/266
5,620,737 A * 4/1997 Kazemzadeh ......... A23K 40/25
426/516
(Continued)

FOREIGN PATENT DOCUMENTS

KR    10-1998-0701915 A    6/1998
KR       20-0298555 Y1    12/2002
(Continued)

OTHER PUBLICATIONS

International Search Report for PCT/KR2014/004882 dated Aug. 22, 2014 from Korean Intellectual Property Office.

*Primary Examiner* — Donald R Spamer
(74) *Attorney, Agent, or Firm* — Revolution IP, PLLC

(57) ABSTRACT

Provided is an animal hair waste treating apparatus, which is intended to dissolve and treat animal hair waste, the apparatus including: a first treatment container configured to inject the animal hair waste and a treating solvent and to be heat-treated; a heating unit for heating the first treatment container; an animal hair waste storage and supply unit supplying the animal hair waste to the first treatment container; a treating solvent storage and supply unit supplying the treating solvent to the first treatment container; and a solid treating unit configured to neutralize the treating
(Continued)

solvent and to filter and discharge remaining solids after treatment of the animal hair waste.

7 Claims, 1 Drawing Sheet

(51) Int. Cl.
 *D06M 11/13* (2006.01)
 *D06M 11/55* (2006.01)
 *D06M 11/64* (2006.01)
 *D06M 19/00* (2006.01)
 *D06M 101/12* (2006.01)

(52) U.S. Cl.
 CPC ............. *D06M 11/55* (2013.01); *D06M 11/64* (2013.01); *D06M 19/00* (2013.01); *D06M 2101/12* (2013.01); *Y02A 40/201* (2018.01); *Y02P 20/145* (2015.11)

(56) References Cited

U.S. PATENT DOCUMENTS

| 6,017,492 A | 1/2000 | Hashimoto | |
|---|---|---|---|
| 2009/0311766 A1* | 12/2009 | Muth | B01F 7/04 |
| | | | 435/173.1 |

FOREIGN PATENT DOCUMENTS

| KR | 10-2008-0055580 A | 6/2008 |
|---|---|---|
| KR | 10-0923224 B1 | 10/2009 |

* cited by examiner

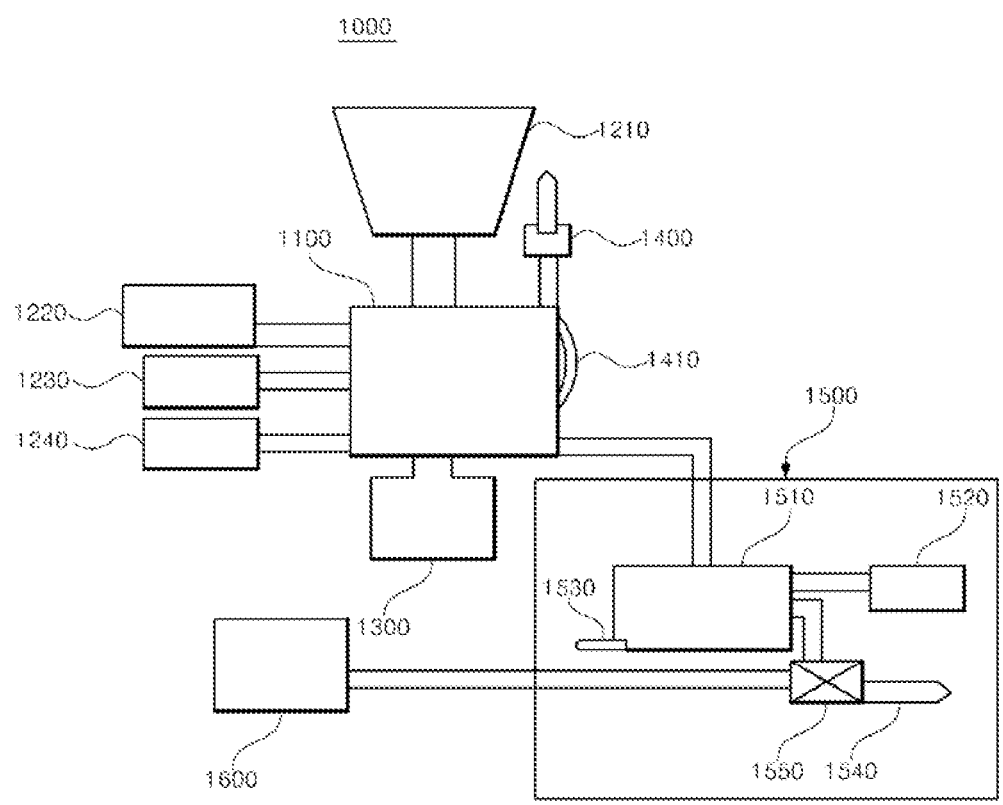

ANIMAL HAIR WASTE TREATING APPARATUS AND METHOD

CROSS REFERENCE TO PRIOR APPLICATIONS

This application is a National Stage Application of PCT International Patent Application No. PCT/KR2014/004882 filed on Jun. 2, 2014, under 35 U.S.C. § 371, which claims priority to Korean Patent Application No. 10-2013-0122354 filed on Oct. 15, 2013, which are all hereby incorporated by reference in their entirety.

BACKGROUND

Field of the Invention

The present invention relates to an apparatus and a method for treating animals' hair or feather waste materials generated from slaughterhouses or stockyards.

Description of the Related Arts

In general, the hairs (or feathers) of animals, such as cows, pigs or chickens contain calcium, magnesium and the like as main components, and a surface thereof is composed of keratin, one kind of protein, which is fire retardant and is not fusible, and accordingly, hair or feather waste materials have been thrown away in the ocean or have been incinerated at a high temperature. However, ocean disposal has been recently prohibited, the waste materials are not easily decomposed, and great expenses are incurred when upon incineration treatment of the waste materials.

Furthermore, the animal's hair does not easily melt at room temperature even if the hair is immersed in a strong acid such as a nitric acid, a sulfuric acid, a hydrochloric acid and the like. Furthermore, when such a strong acid is used in a heating state, explosion may occur due to a sudden oxidation process before melting of the animal hair, and accordingly, the use of the strong acid is very dangerous. Moreover, since the strong acid contains a material such as nitrogen, sulfur, and chlorine and creates a volatile material such as ammonia, air pollution occurs and the melted materials cause secondary pollution in the quality of water. For example, about 10 minutes was required for completely incinerating 10 g of a chicken's feather by indirectly heating it until reaching a temperature of 1,000° C. using a gas burner in a state of the feather being placed in a container. Also, as a result of analyzing a flue gas with a gas analyzer during incineration, polluting gases were measured the following: CO of 50 ppm, SOx of 25 ppm, NOx of 450 ppm and the like. Furthermore, fumes and smell occurred.

SUMMARY

The present invention has been made keeping in mind the above problems occurring in the prior art, and an object of the present invention is to provide an apparatus and a method for treating animal hairs or feathers that do not burn or dissolve easily.

According to an aspect of the present invention, an animal hair waste treating apparatus, which is intended to dissolve and treat animal hair waste, the apparatus may include: a container configured to inject the animal hair waste and a treating solvent; and a heating unit for heating the container.

According to another aspect of the present invention, an animal hair waste treating apparatus, which is intended to dissolve and treat animal hair waste, the apparatus may include: a first treatment container configured to inject the animal hair waste and a treating solvent and to be heat-treated; a heating unit for heating the first treatment container; an animal hair waste storage and supply unit supplying the animal hair waste to the first treatment container; a treating solvent storage and supply unit supplying the treating solvent to the first treatment container; and a solid treating unit configured to neutralize the treating solvent and to filter and discharge remaining solids after treatment of the animal hair waste.

The treating solvent may be supplied in twice as a primary treating solvent and a secondary treating solvent and the treating solvent storage and supply unit may be composed of at least two containers.

The animal hair waste treating apparatus may further include an internal pressure adjusting unit in at least one side of the first treatment container, wherein the internal pressure adjusting unit may include a by-pass tube connected from the first treatment container.

The solid treating unit may be composed of a second treatment container, an acidic solution supply and storage portion, a pH adjusting portion, a solid discharging tube and a waste liquid discharging tube.

According to a further aspect of the present invention, an animal hair waste treating method, which is intended to dissolve and treat animal hair waste, the method may include: injecting a primary treating solvent having a basic property and the animal hair waste into a first treatment container; performing heat treatment by heating the first treatment container; injecting a secondary treating solvent into the first treatment container; discharging a mixture of the heat-treated primary treating solvent, the secondary treating solvent and the animal hair waste to a second treatment container.

The heat treatment may be performed by heating the first treatment container until a temperature of the primary treating solvent becomes 65 to 100° C.

The animal hair waste treating method may further include injecting an acidic solution into the second treatment container to perform neutralizing; and precipitating residues of the animal hair waste in the second treatment container to perform filtering, wherein the acidic solution may be an acid having a pH of 2 and 3, wherein the acidic solution may contain at least one strong acid selected from a group consisting of a nitric acid, a sulfuric acid and a hydrochloric acid.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 1 is a conceptual view schematically showing an animal hair waste treating apparatus according to one embodiment of the present invention.

DETAILED DESCRIPTION

Hereinafter, the embodiments of the present invention that an ordinary person skilled in the art can implement will be described with reference to the accompanying drawings. The embodiments in the specification and the constructions shown in the drawings are provided as a preferred embodiment of the present invention, and it should be understood that there may be various equivalents and modifications which could substitute at the time of filing.

FIG. 1 is a conceptual view schematically showing an animal hair waste treatment apparatus 1000 according to one embodiment of the present invention.

Referring to FIG. 1, the animal hair waste treating apparatus 1000 includes: a first treatment container 1100; a heating unit 1300 for heating the first treatment container 1100; an animal hair waste storage and supply unit 1210 supplying animal hair waste to the first treatment container 1100; treating solvent storage and supply units 1230, 1240 supplying a treating solvent to the first treatment container 1100; and a solid treating unit 1500 for filtering and discharging solids remaining after treating the animal hair waste and then neutralizing the treating solvent.

The treating solvent is supplied in twice as a primary treating solvent and a secondary treating solvent. The primary treating solvent is a solvent containing a basic compound, and the secondary treating solvent may contain a surfactant and a hydroxide of an alkali earth metal.

The primary treating solvent is injected from the primary treating solvent storage and supply unit 1230 to the first treatment container 1100, and water is injected from a first water storage and supply unit 1220 with the injecting of the primary treating solvent or after the injecting of the primary treating solvent. The basic compound contained in the primary treating solvent serves as a dissolution accelerating agent for rapidly dissolving an animal's hair or feather at a relatively low temperature. The basic compound is not largely limited if the basic compound is a compound containing at least one or more hydroxyl group at its terminal or a compound having a hydroxyl group in an aqueous solution. With regard to an injected amount, 10 to 30 parts by weight of the primary treating solvent with respect to 100 parts by weight of water may be injected. Purified water or tap water may be used as the water, and the kind of water is not largely limited if the water can sufficiently dissolve the primary treating solvent.

Then, the animal hair waste is injected into the first treatment container 1100. The animal hair treated by the primary treating solvent may mainly be a mammal's hair or a bird's feather. The mammal's hair or the bird's feather is composed of keratin, one kind of protein, fat, and the like as main components even though they differ from each other with respect to the form thereof. The keratin is also called a hominess (or cutin). The separation of the keratin is performed in such a manner as to form a raw material into powder, treat the powder with a hot organic solvent or hot water, and then remove a protein from it with a protease, thereby remaining the keratin. The main components thereof are a glutamic acid, and an amino acid such as arginine, cystine and the like, and among these elements, cystine is contained in the largest amount. The amount of cystine contained in genuine keratin is 11~12%, and the amount of cystine contained in similar keratin is 4~8%. Due to the large amount of cystine, it is deemed that a peptide chain (—CO—NH—) has a linear structure in which various disulfide bonds (—S—S—) are connected in a mesh form. The keratin does not melt in water and all neutral solvents. Also, the keratin is not easily influenced by a protease such as pepsin, trypsin and the like, but is vulnerable to sodium sulfide, thioglycholic acid, hydrogen peroxide, alkali and the like. This is because the disulfide bonds are broken by these reagents. The animal hair water may be injected in an amount of 80 to 120 parts by weight based on 100 parts by weight of water. When the injected amount of the animal hair waste materials exceeds 90 parts by weight, solubility of the primary treating solvent is reduced, and accordingly, melting treatment of the animal hair waste materials may not be sufficiently performed.

The first treatment container in which the primary treating solvent and the animal hair waste are injected is primarily heat-treated by the heating unit 1300. The heating unit 1300 of the animal hair waste treating apparatus according to one embodiment of the present invention is heated for 1 minute or 5 minutes by setting it at a temperature of 1000° C. At this time, a temperature of the solvent is 50 to 90° C. That is, it is possible to heat the solvent by setting the temperature of the heating unit 1300. When the heating unit 1300 is further heated in a state of being set at a temperature of 1000° C., the temperature thereof becomes 100° C., and thus sudden boiling may be generated. Here, when 20 to 30 parts by weight of the secondary treating solvent is injected from the secondary treating solvent storage and supply unit 1240, the occurrence of sudden boiling can be prevented, and additional animal hair waste can be treated. The secondary treating solvent may be injected by mixing a hydroxide of an alkali earth metal to a surfactant at a rate of 1:1 to 1:1.5. The surfactant may be used by containing at least one of an amine-based compound including at least one hydroxyl group, simple polyol or alcohols, peroxide or a boric oxide and the like.

Also, an internal pressure adjusting unit 1400 including a by-pass tube 1410 is provided in a side of the first treatment container 1100. It is better that the by-pass tube attached to the treatment container 1100 be positioned at the bottom. When the mixture of the primary treating solvent, the second treating solvent and the animal hair waste materials boils, steam may be prevented by the by-pass tube 1410 from being exposed to the outside. Also, a liquid component in the first treatment container 110 may be sufficiently mixed by the bubbling of air.

The treating solvent subjected to heat treatment and the remaining solids are discharged to a neutralization device 1510 of a solid treating unit 1500. A liquid of the treating solvent subjected to the heat treatment is alkaline, and a pH thereof may be 9 to 13.5. The treating solvent subjected to the heat treatment is neutralized in the neutralizing device 1510, and the solids are filtered and are then finally discharged. An acidic solution and water are injected from an acidic solution storage and supply portion 1520 to the neutralizing device. The acidic solution may be an acid having a pH of 2 to 3, and the secondary treatment solution may be an acidic solution containing at least one strong acid of a nitric acid, a sulfuric acid, a hydrochloric acid and the like. A rate of water to the strong acid in the acidic solution may be 100:15 to 100:30.

After the neutralization has been completed, the liquid has neutrality and it is preferable that a pH of the liquid be 7 to 7.2. The solids are precipitated by leaving the liquid for 1 hour or more after the completion of the neutralization. The precipitated solids are discharged through a solid discharging tube 1530, and a waste fluid is discharged to a pH adjusting portion 1550. A sieve having 80 to 100 meshes is provided in the solid discharging tube 1530 so that the solids can be filtered. Water, which is 3 to 5 times the weight of the waste liquid discharged from a second water storage and supply unit 1600 to the pH adjusting portion 1550, is supplied to and diluted with the waste liquid, and then the diluted waste liquid is discharged to a waste liquid discharging tube 1540.

A method of dissolving and treating animal hair waste according to another embodiment of the present invention includes: injecting a primary treating solvent containing a basic compound into a first treatment container; injecting animal hair waste into the first treatment container; performing heat treatment by heating the first treatment container; injecting a secondary treating solvent containing a surfactant and an alkali earth metal into the first treatment container; and discharging a mixture of the heat-treated primary treating solvent, the secondary treating solvent and the animal hair waste to a second treatment container.

The primary treating solvent containing the basic compound may contain 10 to 30 parts by weight of the basic compound with respect to 100 parts by weight of water such as purified water, tap water or the like. When an amount of the basic compound exceeds 30 parts by weight, a pH is excessively increased, and accordingly, this may be a cause of secondary pollution. Meanwhile, when the basic compound is contained in an amount of less than 10 parts by weight, the animal hair waste does not properly dissolve, or many residues occur. The basic compound is not largely limited if the basic compound is a compound containing at least one or more hydroxyl group at its terminal or a compound having a hydroxyl group in an aqueous solution.

Animal hair waste is injected into the primary treating solvent injected in the treatment container. At this time, it is preferable that a rate of an animal hair waste treating composition to the animal hair waste be 1.2:1 to 2:1. A treatment solution in which the primary treating solvent and the animal hair waste are mixed is heated for 1 to 10 minutes, and thus the animal hair waste dissolves sufficiently. At this time, heating may be performed until a temperature of the primary treating solvent becomes 65 to 100° C. Also, the temperature may exceed 100° C.

A surfactant and a hydroxide of an alkali earth metal may be further added to the primary treating solvent. The surfactant is added for preventing sudden boiling from being generated upon the heating of the animal hair waste treating composition and for facilitating dissolution with the hydroxide of the alkali earth metal. The surfactant may be used by containing at least one of an amine-based compound including at least one hydroxyl group, simple polyol or alcohols, peroxide or a boric oxide, and the like. The surfactant may be contained in an amount of 10 to 15 parts by weight based on 100 parts by weight of the water.

The hydroxide of the alkali earth metal, which is a porous material, may prevent sudden boiling from being generated upon the heating of the animal hair waste treating composition. Calcium hydroxide, magnesium hydroxide or the like may be used as the hydroxide of the alkali earth metal, and the hydroxide of the alkali earth metal may be contained in an amount of 10 to 15 parts by weight with respect to 100 parts by weight of the water. The secondary treating solvent may be added after heating and boiling of the primary treating solvent. When the secondary treating solvent is added after the boiling of the primary treating solvent, the mixture of the primary treating solvent, the secondary treating solvent and the animal hair waste may be prevented from sudden boiling.

In the mixture of the primary treating solvent, the secondary treating solvent and the animal hair waste, when the animal hair waste dissolves sufficiently, the mixture is neutralized. The heated mixture has strong alkalinity having a pH of 10 to 13.5, and an acidic solution with a pH of 2 to 3 is injected in the mixture. A nitric acid, a hydrochloric acid or a sulfuric acid may be used as the acidic solution. An injection amount of the acidic solution may be appropriately adjusted according to the type and concentration of used acids so that acidity of the mixture can have a pH of 7 to 7.5.

Then, by precipitating and filtering solids from the mixture and drying the solids, the dried solids may be used as agricultural compost.

Hereinafter, the present invention will be described in greater detail with reference to the example. However, the example is only disclosed for illustrative purposes, and the scope of the present invention should not be limited to the example.

Example 1

45 kg of water, 12 kg of a triethanolamine (produced by Seil Chemical) and 20 kg of swine bristles were injected in the first treatment container, and thus the first treatment container was heated for 5 minutes. The swine bristles dissolved completely at the temperature of about 90° C., and by further performing heating for 1 minute, boiling was performed at the temperature of 100° C. At this time, 6 kg of a triethanolamine (produced by Seil Chemical) and 5 kg of a magnesium hydroxide (produced by Seil Chemical) were additionally injected in the first treatment container, and 5 kg of swine bristles were also further injected. Thus, a measured pH was 9.0.

After this, the waste liquid subjected to heating treatment was discharged to the second treatment container, and 20 kg of 70% nitric acid and 100 kg of water were injected in the waste liquid. After mixing them, a pH was measured as 7.0. Then, solids were precipitated by leaving the neutralized waste liquid for 1 hour or more. The precipitated solids were discharged to the solid discharging tube, and the waste liquid was discharged to the pH adjusting portion, and thereafter, the waste liquid was diluted with water which is five times the weight of the waste liquid, thereby finally discharging the solids.

Measurement and Analysis

No heavy metal was found from the precipitate by IEC62321 Ed. 1.0b:2008(AAS), and ultimate analysis by an element analyzer (EA) is shown in the following Table 1. Through analysis results, it could be seen that the precipitate can be used as compost for crops. Also, as a result of measuring the precipitate's calorie (kcal/kg) using a calorimeter, the precipitate showed a high caloric value of about 2,055 kcal/kg. Accordingly, it could be seen that the precipitate has a sufficient value as an auxiliary material of fuel which can be recycled.

TABLE 1

| Measured Element | Weight % | Analysis Method |
| --- | --- | --- |
| C | 14.5 | EA |
| H | 5.57 | EA |
| N | 2.3 | EA |
| O | 20.9 | EA |
| S | 0 | EA |

As set forth above, the present invention relates to the animal hair waste treating method that facilitates combustion or dissolution of animal hairs, enables the occurrence of waste in a small amount, and allows by-products after treatment of the waste to be recycled as agricultural fertilizers and the like.

According to the present invention, secondary pollution such as a chlorine gas, SOx, NOx and the like resulting from transportation and incineration of the waste can be removed or reduced, and the costs incurred for treating animal hairs can be reduced.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

EXPLANATION OF NUMBER

1000: animal hair waste treatment apparatus
1100: first treatment container
1210: animal hair waste storage and supply unit
1220: first water storage and supply unit
1230: the primary treating solvent storage and supply unit
1240: the secondary treating solvent storage and supply unit
1300: heating unit
1400: internal pressure adjusting unit
1500: solid treating unit
1600: second water storage and supply unit

What is claimed is:

1. An animal hair waste treating apparatus, which is intended to dissolve and treat animal hair waste, the apparatus comprising:
    a first treatment container configured to inject the animal hair waste and a treating solvent and to be heat-treated;
    a heater heating the first treatment container;
    an animal hair waste storage and supply chamber supplying the animal hair waste to the first treatment container;
    a water storage and supply chamber being connected to the first treatment container and supplying water to the first treatment container;
    a first treating solvent storage and supply chamber comprising a basic compound and supplying the basic compound to the first treatment container;
    a second treating solvent storage and supply chamber comprising a mixture of hydroxide of an alkali earth metal and a surfactant at a ratio of 1:1 to 1:5, and supplying the mixture to the first treatment container;
    a neutralization device configured to neutralize the treating solvent and to filter and discharge remaining solids after treatment of the animal hair waste; and
    an internal pressure regulator disposed at one side of the first treatment container, wherein the internal pressure regulator comprises a by-pass tube connected from the first treatment container, the internal pressure regulator configured to regulate steam by the by-pass tube, the steam resulted from the heater heating the first treatment container.

2. The apparatus of claim 1, wherein the neutralization device is connected to an acidic solution supply and storage portion, a pH adjusting portion, a solid discharging tube and a waste liquid discharging tube.

3. An animal hair waste treating method, which is intended to dissolve and treat animal hair waste, the method comprising:
    injecting a primary treating solvent disposed at a primary treating solvent chamber and the animal hair waste into a first treatment container, wherein the primary treating solvent is a basic compound;
    injecting water to the first treatment container from a water storage and supply chamber;
    performing heat treatment by heating the first treatment container;
    injecting a secondary treating solvent into the first treatment container, wherein the secondary treating solvent is disposed at a secondary treating solvent chamber and is a mixture of hydroxide of an alkali earth metal and a surfactant at a ratio of 1:1 to 1:5;
    regulating an internal pressure of the first treatment container by an internal pressure regulator, the internal pressure regulator having a by-pass tube connected from the first treatment container, the internal pressure regulator configured to regulate steam by the by-pass tube, the steam resulted from the heater heating the first treatment container; and
    discharging a mixture of the heat-treated primary treating solvent, the secondary treating solvent and the animal hair waste to a second treatment container.

4. The method of claim 3, wherein the heat treatment is performed by heating the first treatment container until a temperature of the primary treating solvent becomes 65 to 100° C.

5. The method of claim 3, further comprising:
    injecting an acidic solution into the second treatment container to perform neutralizing; and
    precipitating residues of the animal hair waste in the second treatment container and filtering thereof.

6. The method of claim 5, wherein the acidic solution is an acid having a pH 2 to pH 3.

7. The method of claim 5, wherein the acidic solution contains at least one strong acid selected from a group consisting of a nitric acid, a sulfuric acid and a hydrochloric acid.

* * * * *